Patented Aug. 18, 1931

1,819,686

UNITED STATES PATENT OFFICE

ANDREW MALINOVSZKY, OF SOUTH GATE, CALIFORNIA, ASSIGNOR TO MALINITE PRODUCTS, INC., OF LOS ANGELES, CALIFORNIA, A CORPORATION OF CALIFORNIA

METHOD OF MAKING TILE

No Drawing.  Application filed October 15, 1929.  Serial No. 399,878.

This invention relates to a new and improved tile body and to a method of producing the same. The invention is also directed toward a new and novel vitrified tile having the characteristics of desirable absorption, high strength and a low coefficient of expansion. The invention also embraces a method of manufacturing a tile body whereby an extremely short burning period is sufficient and during which the tile shows substantially no drying or burning shrinkage.

Decorative tile made from clay bodies have been employed in architectural work for a considerable period of time. The manufacture of tile normally requires two burning operations, namely, a bisque burn and a final burn, in which the glaze is applied to the tile. Normally, the two burning operations require an intermediate cooling period so that the tile bodies, after being subjected to the bisque burn may be covered with a glaze (either in liquid or powdered form), and returned to the kilns wherein they are burned until the glaze reaches maturity and bonds with the body. Ordinarily the entire process requires from 40 to 60 days.

Furthermore, clay tile made in accordance with the prior art can only be glazed with a rather limited number of compositions. This is due to the fact that clays have a high drying and burning shrinkage and have a high coefficient of expansion, so that it necessary to employ glazes having substantially the same coefficient of expansion as the clay body. This limitation imposed upon the glazes results in the fact that only certain specific colors can be produced, whereas colors such as, for example, brilliant red can not be produced. Furthermore, due to the high coefficient of expansion of the clay body, it is extremely hard to produce glazed tile commercially without a high manufacturing loss due to the production of imperfect tile. Large quantities of the produced tile are unsatisfactory because of checking, crazing, and crawling. Furthermore, the strength of the tile is relatively low and a considerable amount of breakage occurs during making.

An object of this invention is to disclose and provide a composition for use in tile bodies which permits the use of numerous glazes which could not be employed heretofore.

Another object is to disclose and provide a method of producing vitrified tile bodies.

Another object is to disclose and provide a new and novel method of producing clay bodies whereby the time required for burning the body and applying the glaze may be reduced to hours instead of days. An object of this invention is to disclose and provide a tile body consisting of particles of magnesia-containing material suspended in discontinuously-associated glass-like binder.

A still further object is to disclose and provide a glazed tile which is especially resistant to freezing or quenching.

A still further object is to disclose and provide a tile body having a coefficient of expansion substantially equal to the coefficient of expansion of the glaze.

Another object is to disclose and provide a method whereby the coefficient of expansion of tile bodies may be controlled.

Other objects, uses and advantages of this invention will become apparent from the following detailed description of the tile and of a preferred method of operation.

I have discovered that a bisque body containing from 40 to 70% of silica ($SiO_2$), 2 to 12% of alumina ($Al_2O_3$), 15 to 50% of magnesia ($MgO$), 5 to 8% of lime ($CaO$), 1 to 6% of lead oxide ($PbO$), and 2 to 6% of soda ($Na_2O$), has all of the desirable characteristics essential for the production of a good tile.

Bodies coming within the above composition have a coefficient of expansion substantially equivalent to that of the glazes which may be employed. In its green state it can be exposed to high temperatures suddenly without shattering it, has a high strength when burned and the resulting tile resists repeated freezing operations without disintegrating.

Preferably, bodies coming within the above composition are prepared from glass, clay and calcined magnesite. The magnesium may be introduced into the body not only in the form of calcined magnesite, but also in the form of any substantially dehydrated or calcined magnesium silicate. For example, serpentine, steatite or other magnesia-containing minerals may be employed. The glass used is preferably a soda lime glass, although lead glasses may also be employed. Glass high in alumina is preferably desirable. Boro-silicate or borax glass may also be used.

All of the raw ingredients mentioned hereinabove are preferably used in finely ground form, namely, reduced to 60 or 80 mesh. If a soda lime glass is employed, lead oxide or other substance or compound having substantially the same effect as far as fluxing is concerned (such as barium oxide) may have to be added to the mixture. All of these ingredients after having been reduced to a fine state of division are blended in the required proportions, so as to produce a body coming within the chemical analysis given hereinabove. These ingredients after being mixed are moistened with water (preferably not exceeding about 15% and generally requiring only 8 to 10% of water), and moulded into the desired shape under pressure.

Any suitable pressure may be employed, pressures of 500 to 2000 lbs. per square inch having been used successfully. The pressed or moulded bodies are then preferably dried, either in the air or in a suitable drier. When driers are employed, the rate of temperature rise should not be high and preferably the drier temperatures should be maintained below 140° F. for the first few hours.

In order to assist in maintaining the pressed bodies in a coherent condition during the drying step, it may be desirable to introduce a small quantity of organic binder into the mixing water. For example goulack (a sulphite pitch residue) and casein solutions have been used successfully.

The moulded and dried tile bodies are then preferably introduced into a preheated muffle kiln or other suitable furnace. The kiln or muffle should be at a temperature of from about 1700 to 2200° F., depending somewhat upon the character of the tile body. For example, if the tile body contains only a small percentage of lead it is desirable to employ burning temperatures of 2000 to 22,000° F. If, however, the tile body contains an appreciable quantity of lead, say 4 to 6%, then temperatures of from 1700 to 1900° F. may be employed.

The tile should be supported on a substantially plane surface, such as for example, a large refractory tile, so that during burning the tile bodies will not warp or deform. Grids made of temperature resisting metal may be successfully used.

The temperature employed during the burning operation should be sufficient to vitrify the glass and maintain the calcined magnesite or other magnesium containing mineral in the matrix. In view of the fact that an appreciable percentage of lead is normally present, the glass has its fusing point materially reduced, and thus vitrifies at a relatively low temperature of from say, 1700 to 2200° F. It is not desired to reduce the entire tile body to a vitreous state, but to merely render the glass sufficiently fluid to form a matrix in which the calcined magnesite or other magnesia containing mineral is suspended. For this reason the tile are maintained in the kiln or muffle for only about 12 to 25 minutes.

At the expiration of the bisque burning described hereinabove, the tile are removed, while still hot, immediately sprinkled or covered with the desired glaze, and reintroduced into the furnace or muffle. This second burning occupies only 2 to 10 minutes time, this being sufficient to permit the enamel or glaze to flow out smoothly over the entire face of the tile. At the expiration of this short period of time, the tile are again removed from the muffle or kiln and permitted to cool.

It has been found that the final cooling may take place in the open air, although it may be desirable to place the tile in a chamber so that the tile drop from a temperature of say 1800° to about 400° F. in two hours. It will be found that this severe cooling does not cause cracking in the tile.

For purposes of illustration, the following burning schedule was followed in producing glazed tile from a composition containing 66% of silica, 3% of alumina, 7% of lime, 18% magnesia, 4% of soda and 2% of lead.

| | | |
|---|---|---|
| Total time of bisquiting | 15 min. | 20 min. |
| Kiln temp. at start of bisquiting | 1900° F. | 1900° F. |
| Kiln temp. at end of bisquiting | 1825° F. | 1885° F. |
| Average temperature during bisquiting | 1830° F. | 1860° F. |
| Average temp. during glost burn | 1800° F. | 1815° F. |
| Shrinkage (average) | 1.6% | 1.6% |
| Absorption (average) | 20.2% | 22.2% |
| Hardness (average) | 5.0 | 5.5 |

The glost burning occupied a firing time of approximately 6 minutes. The glaze was applied through a mechanically vibrated sieve; the tile were removed from the kiln at the end of the glost burn and placed in a chamber through which a draft of air was permitted to pass so that the tile were cooled to about 100° F. in 6 hours. It is thus possible to produce complete glazed tile by means of this process in less than 1 hour, or within 24 hours if the entire cooling period is taken into consideration.

It is to be understood that the bisque burn is only sufficient to render the particles of clay sufficiently fluid to bond to each other. The function of the lead oxide is to lower the fusion point of the glass matrix. The amount of addition of lead oxide is governed by the composition of the glass and the required hardness and density of the body to produce a semi-vitrification of the body.

Although the shrinkage of the specimens described in the above table was 1.6% it is possible to produce tile which, during burning have a shrinkage of only about 1%. The drying shrinkage is substantially negligible.

Attention is called to the fact that the tile have a hardness ranging from 4 to 5.5. The breaking strength of the tile is over 5000 lbs. per square inch. The absorption, ranging from about 20 to 25%, permits the tile to bond thoroughly with the mortar or other cementitious composition used in laying them. The density of the body, however, is sufficient to prevent discoloration from steams being transferred through the body by the mortar in which the tiles are set or by atmospheric moisture.

Tile produced in accordance with the hereinabove described manner have been subjected to severe quenching tests. For example, the tile were placed in boiling water and then quenched in ice water, and these steps repeated ten times in fairly rapid succession without showing any crazing of the enamel or glaze. Furthermore, the tile were subjected to freezing tests using salt and ice as the cooling medium, by means of which the temperature reached was 17° F. and the tile (which were saturated with water) were frozen in a solid block of ice. These frozen tile upon being thrown into hot water showed no disintegration whatsoever.

The coefficient of expansion of the tile body described hereinabove may be governed by the addition of calcined magnesite thereto, or by the proportion of the magnesite-containing calcined mineral added to the body. Magnesium oxide has a coefficient of expansion as low as 0.1, whereas other ingredients such as alumina, lime and lead have coefficients of expansion of between 4 and 5. By multiplying the percentage of the ingredient present in the body by the factor representing the coefficient of expansion, it is possible to determine in advance the approximate coefficient of expansion of the tile body.

For example, the specific body composition given hereinabove containing 66% of silica, 3% alumina, 7% lime, 18% magnesia, 4% soda, and 2% lead oxide, gives a tile body possessing a coefficient of expansion of 152.366. This body is particularly adapted to receive glazes having a coefficient of expansion of 152.3 to 152.4. By performing a similar calculation for the glaze, it is possible to coordinate the coefficient of expansion of the brick to the coefficient of expansion of the bisque, so that the resulting tile will show a perfect bond between the glaze and the body, and the loss through cracking, checking or crazing will be negligible.

Certain glazes have a coefficient of expansion which renders their application to clay tile impossible, because of the coefficient of expansion of the glaze, but bodies made in accordance with this invention may be produced having a coefficient of expansion similar to that of the glaze and, therefore, capable of receiving such glaze.

Although a particular combination of ingredients has been disclosed hereinabove and the method of operation has been described in detail as regards a preferred embodiment of the invention, it is to be understood that the invention is not limited to the precise steps, ingredients or proportions set forth hereinabove, but includes all such modifications and changes as come within the scope of the appended claims.

I claim:

1. In a method of making tile, the steps of reducing a glass to a state of fine division, reducing a magnesia-containing material to a state of fine division, mixing and moistening the materials, moulding bodies under pressure from said mixture, drying the moulded bodies, and then burning said bodies at a temperature and for a time sufficient to incompletely vitrify the glass.

2. In the manufacture of glazed tile, the steps of forming a tile body consisting of a calcined magnesia-containing material suspended in a discontinuously associated glass-like binder, controlling the coefficient of expansion of said tile body by varying the content of calcined magnesia-containing mineral in said tile body, applying a frit to said body, said frit having a coefficient of expansion substantially equivalent to the coefficient of expansion of said body, and then subjecting the tile body and frit to a glost burn.

3. In a method of making tile, the step of reducing a glass to a fine state of division, reducing a calcined magnesia-containing material to a fine state of division, mixing the materials, moistening the mixture, moulding bodies under pressure from said mixture, drying the moulded bodies and then burning said bodies at a temperature and for a time sufficient to incompletely vitrify the glass.

4. In a method of making tile, the steps of mixing a finely divided glass and a calcined magnesia-containing material with a flux having the characteristics of lead oxide, moistening the mixture, moulding the mixture under pressure, drying the moulded bodies, and then subjecting the moulded bodies to a temperature and for a time sufficient to incompletely vitrify the glass so as to form a discontinuously associated glassy matrix binding the magnesia-containing material.

5. In a process of making glazed tile, the steps of subjecting a dry moulded tile body to a temperature of more than about 1700 F., for a period of time not exceeding 30 minutes, withdrawing the tile from the heating zone, applying a glaze to the hot tile, and reintroducing the tile into the heating zone for a period not to exceed 10 minutes.

6. In a method of making glazed tile, the steps of introducing an unburned but dry tile body into a heating zone preheated to a temperature of above 1700° F., maintaining the tile in said heating zone for a period of not over 30 minutes, withdrawing the tile from said heating zone, applying a glaze to said tile, and reintroducing the glazed tile into the heating zone for a period not exceeding about ten minutes.

7. In a method of making glazed tile, the steps of introducing an unburned but dry tile body into a heating zone preheated to a temperature of above 1700° F., maintaining the tile in said heating zone for a period of not over 30 minutes, withdrawing the tile from said heating zone, applying a glaze to said tile, reintroducing the glazed tile into the heating zone for a period not exceeding about 10 minutes, and then rapidly cooling the tile.

8. A method of making glazed tile comprising moulding tile from vitrifiable and highly refractory materials, drying the tile, introducing the dried tile into a heating zone preheated to a temperature of above about 1700 degrees F., maintaining the tile in said heating zone for a period not exceeding about thirty minutes but for a period of time sufficient to partially vitrify the vitrifiable constituents of the tile, withdrawing the tile from the heating zone, applying a glaze to the tile while still hot, reintroducing the tile into the heating zone for a period of time sufficient to cause the glaze to mature, then withdrawing the tile from the heating zone and permitting the tile to cool.

9. In a method of making tile, the steps of mixing a finely divided glass, a magnesia-containing material and a flux, moistening the mixture, moulding bodies under pressure from said mixture, drying the moulded bodies, subjecting the moulded bodies to a temperature and for a time sufficient to incompletely vitrify the glass so as to form a discontinuously-associated glassy matrix binding the magnesia-containing material, applying a glaze to the burned bodies while they are still hot, and again subjecting said bodies to a temperature to cause the glaze to mature.

10. In a method of making tile, the steps of making and mixing a finely divided glass, a magnesia-containing material and a flux, moistening the mixture, moulding bodies under pressure from said mixture, drying the moulded bodies, and subjecting the moulded bodies to a temperature and for a time sufficient to incompletely vitrify the glass so as to form a discontinuously-associated glassy matrix binding the magnesia-containing material.

Signed at Los Angeles, Calif., this 7th day of October, 1929.

ANDREW MALINOVSZKY.